United States Patent
Viljoen

(10) Patent No.: US 10,320,818 B2
(45) Date of Patent: Jun. 11, 2019

(54) SYSTEMS AND METHODS FOR DETECTING MALICIOUS COMPUTING EVENTS

(71) Applicant: Symantec Corporation, Mountain View, CA (US)

(72) Inventor: Pieter Viljoen, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 170 days.

(21) Appl. No.: 15/431,795

(22) Filed: Feb. 14, 2017

(65) Prior Publication Data
US 2018/0234434 A1   Aug. 16, 2018

(51) Int. Cl.
*H04L 29/06*   (2006.01)
*G06F 21/55*   (2013.01)
*G06F 21/56*   (2013.01)

(52) U.S. Cl.
CPC ........ *H04L 63/1416* (2013.01); *G06F 21/554* (2013.01); *G06F 21/566* (2013.01);
(Continued)

(58) Field of Classification Search
CPC ............. H04L 63/1416; H04L 63/1425; H04L 63/1466; H04L 63/1433; H04L 63/20;
(Continued)

(56) References Cited

U.S. PATENT DOCUMENTS 7,257,630 B2 * 8/2007 Cole .................... G02B 5/3083
709/224
7,437,760 B2 * 10/2008 Dettinger .............. H04L 63/145
713/150
(Continued)

OTHER PUBLICATIONS

SONAR; Symantec; https://support.symatec.com/en_US/article. HOWTO80968.html; Oct. 28, 2016.
(Continued)

*Primary Examiner* — Farid Homayounmehr
*Assistant Examiner* — Raied A Salman
(74) *Attorney, Agent, or Firm* — FisherBroyles, LLP

(57) ABSTRACT

The disclosed computer-implemented method for detecting malicious computing events may include (i) determining, for multiple computing events detected within an enterprise, an initial disposition score for each computing event based on currently-available security information, (ii) determining an initial classification of each computing event as malicious or non-malicious by comparing the initial disposition score of each computing event with a threshold disposition score, (iii) for each computing event, determining (a) an updated disposition score based on new security information (b) an updated classification, (iv) calculating a degree to which the threshold disposition score correctly identifies malicious computing events by determining a frequency with which the initial classification of each computing event matches the updated classification of the computing event, and (v) adjusting the threshold disposition score based on the degree to which the threshold disposition score correctly identifies malicious computing events.

18 Claims, 7 Drawing Sheets

(52) U.S. Cl.
CPC ........ *H04L 63/145* (2013.01); *H04L 63/1408* (2013.01); *H04L 63/1441* (2013.01)

(58) Field of Classification Search
CPC ..... H04L 29/06; G06F 17/3053; G06F 17/30; G06F 21/24; G06F 21/00
USPC ............................... 726/23, 24, 25; 709/232
See application file for complete search history.

(56) References Cited

U.S. PATENT DOCUMENTS

| | | | | |
|---|---|---|---|---|
| 7,730,538 | B2* | 6/2010 | Fries ................... | G06F 11/1448 726/22 |
| 7,836,506 | B2* | 11/2010 | Liu ..................... | G06F 11/2294 713/187 |
| 8,572,007 | B1 | 10/2013 | Manadhata | |
| 8,572,184 | B1* | 10/2013 | Cosoi ................... | H04L 51/12 709/206 |
| 9,516,053 | B1 | 12/2016 | Muddu | |
| 10,243,977 | B1* | 3/2019 | Govindarajan ..... | H04L 63/1416 |
| 2003/0154393 | A1* | 8/2003 | Young .................. | G06F 21/577 726/25 |
| 2004/0049698 | A1* | 3/2004 | Ott ....................... | G06F 21/554 726/23 |
| 2010/0077481 | A1* | 3/2010 | Polyakov .............. | G06F 21/552 726/24 |
| 2011/0047618 | A1* | 2/2011 | Evans ................... | G06F 21/566 726/23 |
| 2012/0240185 | A1* | 9/2012 | Kapoor ............... | H04L 63/1425 726/1 |
| 2014/0215618 | A1* | 7/2014 | Striem Amit .......... | G06F 21/55 726/23 |
| 2015/0067859 | A1* | 3/2015 | Katz ................... | H04L 63/1408 726/23 |
| 2015/0101049 | A1 | 4/2015 | Lukacs | |
| 2016/0255107 | A1* | 9/2016 | Qian ................... | H04L 63/1425 726/23 |
| 2017/0286671 | A1* | 10/2017 | Chari ................... | G06F 21/552 |
| 2018/0041533 | A1* | 2/2018 | Chesla ............. | G06F 16/24578 |
| 2018/0167402 | A1* | 6/2018 | Scheidler ............. | G06F 21/552 |
| 2018/0234434 | A1* | 8/2018 | Viljoen ............... | H04L 63/1416 |

OTHER PUBLICATIONS

Viljoen; Systems and Methods for Evaluating Security Services; U.S. Appl. No. 15/432,905, filed Feb. 14, 2017.

Sankruthi; Systems and Methods for Evaluating Security Software Configurations; U.S. Appl. No. 15/362,169, filed Nov. 29, 2016.

* cited by examiner

SYSTEMS AND METHODS FOR DETECTING MALICIOUS COMPUTING EVENTS

CROSS REFERENCE TO RELATED APPLICATION

This application incorporates by reference the entirety of U.S. application Ser. No. 15/432,905 by Pieter Viljoen, and titled Systems and Methods for Evaluating Security Services, filed on 14 Feb. 2017.

BACKGROUND

Individuals and organizations frequently use various software security systems to protect their computing devices against abnormal and/or unwanted activity. Such security systems may detect potentially malicious computing events or behaviors on an endpoint device and then determine whether these incidents meet a certain threshold or degree of suspicion. Computing events that meet this threshold may be classified as malicious and a security system may block, remove, or otherwise prevent files or objects involved in these events from harming an endpoint device.

Unfortunately, traditional security services may be unable to accurately or efficiently identify malicious computing events within an enterprise. For example, if a conventional anti-malware technology lacks knowledge of a file's reputation when the file is first seen by an enterprise, the anti-malware technology may fail to detect security threats associated with the file, even if information indicating the reputation of the file becomes available at a later point in time. In addition, traditional security systems may not allow customers to tailor malware-detection processes to the needs of their own enterprises. For example, a traditional security system may implement a standard or default metric by which to classify malicious computing events across multiple enterprises, regardless of the security services requested or required by individual enterprises. The instant disclosure, therefore, identifies and addresses a need for systems and methods for detecting malicious computing events.

SUMMARY

As will be described in greater detail below, the instant disclosure describes various systems and methods for detecting malicious computing events. In one example, a method for detecting malicious computing events may include (i) determining, for multiple computing events detected within an enterprise, an initial disposition score for each computing event that indicates a likelihood that the computing event is malicious based on currently-available security information, (ii) determining an initial classification of each computing event as malicious or non-malicious by comparing the initial disposition score of each computing event with a threshold disposition score that represents a minimum disposition score indicative of malicious computing events, (iii) determining, for each computing event after the initial disposition score for the computing event has been determined (a) an updated disposition score based on new security information that was not available when the initial disposition score was determined and (b) an updated classification by comparing the updated disposition score with the threshold disposition score, (iv) calculating a degree to which the threshold disposition score correctly identifies malicious computing events by determining a frequency with which the initial classification of each computing event matches the updated classification of the computing event, and (v) protecting the enterprise from security threats by adjusting the threshold disposition score based on the degree to which the threshold disposition score correctly identifies malicious computing events.

In some examples, the computing events may include an attempt to download a file onto an endpoint device within the enterprise. Additionally or alternatively, the computing events may include an attempt to distribute sensitive information from within the enterprise to an external entity and/or an attempt by the external entity to access the sensitive information.

In some embodiments, the method may further include receiving, at a backend security server, at least one computing event from a security agent installed on at least one endpoint device within the enterprise. In such embodiments, the method may also include receiving at least a portion of a configuration of the endpoint device at a point in time at which the computing event was detected. Additionally, in these embodiments, determining the updated disposition score of the computing event may include re-analyzing the configuration of the endpoint device using the new security information.

In some examples, determining the frequency with which the initial classification of each computing event matches the updated classification of the computing event may include determining a false positive rate produced by the threshold disposition score by calculating a percentage of computing events that have an initial classification of malicious and an updated classification of non-malicious. Additionally or alternatively, determining the frequency may include determining a false negative rate produced by the threshold disposition score by calculating a percentage of computing events that have an initial classification of non-malicious and an updated classification of malicious. In these examples, calculating the degree to which the threshold disposition score correctly identifies malicious computing events may include calculating a ratio of the false positive rate to the false negative rate.

In these examples, the method may further include receiving, from the enterprise, a desired ratio of false positives to false negatives that corresponds to a desired strictness of security services implemented within the enterprise. In general, a high ratio of false positives to false negatives may correspond to a strict security service. In these examples, adjusting the threshold disposition score may include determining, based on a retrospective analysis of the initial disposition scores and the updated disposition scores of the computing events, an optimal threshold disposition score that produces the desired ratio of false positives to false negatives.

Furthermore, in these examples, the method may include identifying computing events whose initial disposition scores were false positives and adding the identified computing events to a whitelist within the enterprise such that similar computing events are classified as non-malicious. The method may also include decreasing the threshold disposition score after adding the identified computing events to the whitelist.

In one embodiment, a system for detecting malicious computing events may include several modules stored in memory, including (i) a scoring module that determines, for multiple computing events detected within an enterprise (a) an initial disposition score for each computing event that indicates a likelihood that the computing event is malicious based on currently-available security information and (b) an updated disposition score based on new security information that was not available when the initial disposition score was determined, (ii) a classification module that determines (a) an initial classification of each computing event as malicious or non-malicious by comparing the initial disposition score of each computing event with a threshold disposition score that represents a minimum disposition score indicative of malicious computing events and (b) an updated classification by comparing the updated disposition score with the threshold disposition score, (iii) a calculation module that calculates a degree to which the threshold disposition score correctly identifies malicious computing events by determining a frequency with which the initial classification of each computing event matches the updated classification of the computing event, and (iv) a security module that protects the enterprise from security threats by adjusting the threshold disposition score based on the degree to which the threshold disposition score correctly identifies malicious computing events. In addition, the system may include at least one physical processor configured to execute the scoring module, the classification module, the calculation module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) determine, for multiple computing events detected within an enterprise, an initial disposition score for each computing event that indicates a likelihood that the computing event is malicious based on currently-available security information, (ii) determine an initial classification of each computing event as malicious or non-malicious by comparing the initial disposition score of each computing event with a threshold disposition score that represents a minimum disposition score indicative of malicious computing events, (iii) determine, for each computing event after the initial disposition score for the computing event has been determined (a) an updated disposition score based on new security information that was not available when the initial disposition score was determined (b) an updated classification by comparing the updated disposition score with the threshold disposition score, (iv) calculate a degree to which the threshold disposition score correctly identifies malicious computing events by determining a frequency with which the initial classification of each computing event matches the updated classification of the computing event, and (v) protect the enterprise from security threats by adjusting the threshold disposition score based on the degree to which the threshold disposition score correctly identifies malicious computing events.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
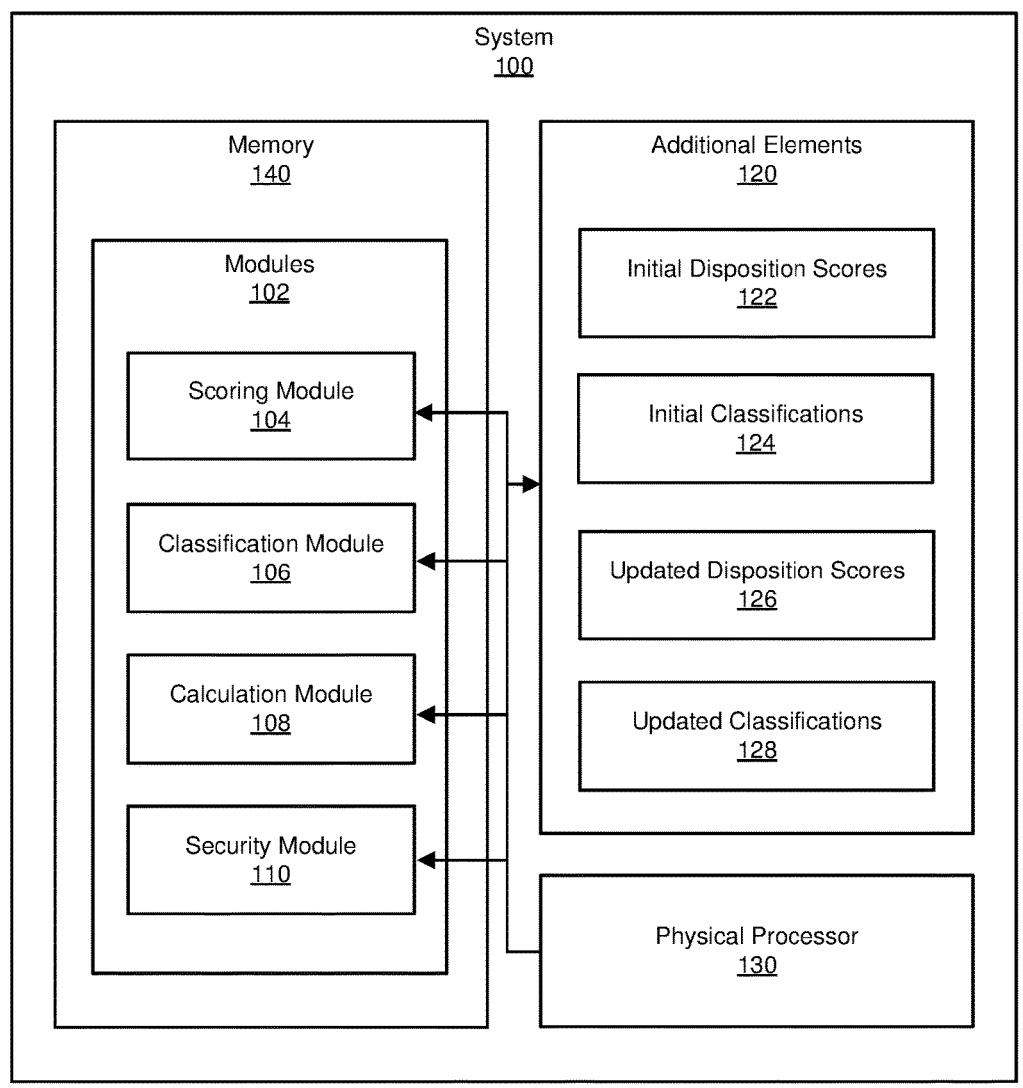
FIG. 1 is a block diagram of an example system for detecting malicious computing events.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting malicious computing events. As will be explained in greater detail below, by recording attributes of suspicious files, behaviors, and other computing events detected on endpoint devices, the disclosed systems and methods may determine both initial disposition scores for the events immediately after the events are detected and updated disposition scores when additional security information relevant to the events becomes available. In addition, the systems and methods described herein may perform retrospective analyses on the information recorded about the computing events to evaluate the performance of security metrics used to classify the events as malicious or non-malicious. The disclosed systems and methods may then use these analyses to adjust security policies within an enterprise to most effectively meet the security needs of the enterprise.

In addition, the systems and methods described herein may improve the functioning of a computing device within an enterprise by detecting malicious files based on an optimized threshold that classifies malware and other security threats according to a particular level of strictness or leniency requested by the enterprise. These systems and methods may also improve the field of malware detection (in particular, the field of retrospective static detection) by enabling efficient and accurate classifications of suspicious computing events after the events have occurred (e.g., based on analyses of recorded historical information about the computing events).

Figure 2:
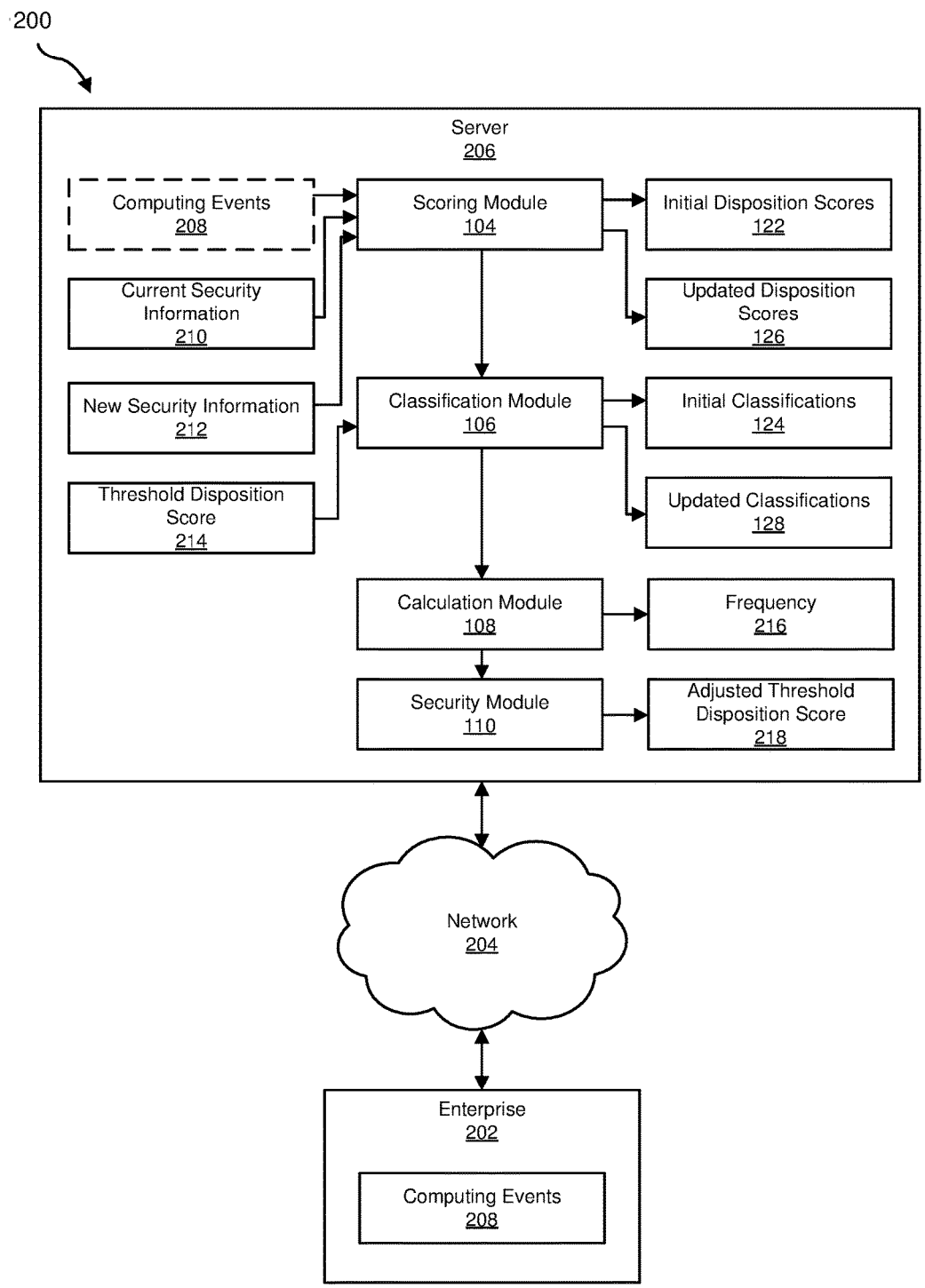
FIG. 2 is a block diagram of an additional example system for detecting malicious computing events.

The following will provide, with reference to FIGS. 1 and 2, detailed descriptions of example systems for detecting malicious computing events. Detailed descriptions of corresponding computer-implemented methods will also be provided in connection with FIG. 3. Detailed descriptions of changes in example disposition scores over time will be provided in FIG. 4. In addition, detailed descriptions of changes in example false positive and false negative rates with changes in threshold disposition scores will be provided in connection with FIG. 5. Finally, detailed descriptions of an example computing system and network architecture capable of implementing one or more of the embodiments described herein will be provided in connection with FIGS. 6 and 7, respectively.

FIG. 1 is a block diagram of an example system 100 for detecting malicious computing events. As illustrated in this figure, example system 100 may include one or more modules 102 for performing one or more tasks. As will be explained in greater detail below, example system 100 may include a scoring module 104 that determines, for multiple computing events detected within an enterprise (i) an initial disposition score for each computing event that indicates a likelihood that the computing event is malicious based on currently-available security information and (ii) an updated disposition score based on new security information that was not available when the initial disposition score was determined. In addition, example system 100 may include a classification module 106 that determines, for each computing event (i) an initial classification as malicious or non-malicious by comparing the initial disposition score of the computing event with a threshold disposition score that represents a minimum disposition score indicative of malicious computing events and (ii) an updated classification by comparing the updated disposition score of the computing event with the threshold disposition score.

As will be explained in greater detail below, example system 100 may also include a calculation module 108 that calculates a degree to which the threshold disposition score correctly identifies malicious computing events by determining a frequency with which the initial classification of each computing event matches the updated classification of the computing event. Finally, example system 100 may include a security module 110 that protects the enterprise from security threats by adjusting the threshold disposition score based on the degree to which the threshold disposition score correctly identifies malicious computing events. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., security server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting malicious computing events. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120. In one example, additional elements 120 may include one or more disposition scores, such as initial disposition scores 122 and updated disposition scores 126. Initial disposition scores 122 generally represent the first quantitative assessment or evaluation of the security characteristics of a set of computing events detected within an enterprise. In particular, initial disposition scores 122 may be based on security information or security tests available to or known by a security service at the time the computing events were detected. In addition, updated disposition scores 126 generally represent any type or form of subsequent assessment or evaluation of the security characteristics of the computing events based on new security information that was not available when initial disposition scores 122 were determined.

Additional elements 120 may also include one or more classifications, such as initial classifications 124 and updated classifications 128. Initial classifications 124 generally represent any qualitative assessment of initial disposition scores 122. In one embodiment, initial classifications 124 may be generated by comparing initial disposition scores 122 with a threshold disposition score. In addition, updated classifications 128 generally represent any qualitative assessment of updated disposition scores 126.

Example system 100 in FIG. 1 may be implemented in a variety of ways. For example, all or a portion of example system 100 may represent portions of example system 200 in FIG. 2. As shown in FIG. 2, system 200 may include one or more computing devices within an enterprise 202 in communication with a security server 206 via a network 204. In one example, all or a portion of the functionality of modules 102 may be performed by security server 206 and/or any other suitable computing system. As will be described in greater detail below, one or more of modules 102 from FIG. 1 may, when executed by at least one processor of security server 206, enable security server 206 to detect malicious computing events.

For example, and as will be described in greater detail below, scoring module 104 may cause security server 206 to determine, for computing events 208 detected within enterprise 202, initial disposition scores 122 that indicate likelihoods that computing events 208 are malicious based on current security information 210. In addition, classification module 106 may cause security server 206 to determine initial classifications 124 by comparing each of initial disposition scores 122 with a threshold disposition score 214. After initial disposition scores 122 have been determined, scoring module 104 may cause security server 206 to determine updated disposition scores 126 based on new security information 212. In addition, classification module 106 may cause security server 206 to determine updated classifications 128 by comparing each of updated disposition scores 126 with threshold disposition score 214. Next, calculation module 108 may cause security server 206 to calculate a degree to which threshold disposition score 214 correctly identifies malicious computing events by determining a frequency 216 with which initial classifications 124 match updated classifications 128. Finally, security module 110 may cause security server 206 to protect enterprise 202 from security threats determining an adjusted threshold disposition score 218 based on the degree to which threshold disposition score 214 correctly identifies malicious computing events.

Enterprise 202 generally represents any type or form of individual, group of individuals, business, or organization that subscribes to or implements a security service. In some examples, enterprise 202 may include one or more endpoint devices. In one embodiment, the endpoint devices within enterprise 202 may operate client-side security software (e.g., software agents managed by a security service). Examples of such endpoint devices include any type or form of computing device capable of reading computer-executable instructions, such as laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Security server 206 generally represents any type or form of computing device that is capable of receiving, analyzing, classifying, and/or re-classifying computing events detected on endpoint devices. In one example, security server 206 may represent a backend security server that provides security services for one or more enterprises (such as enterprise 202). Additional examples of security server 206 include, without limitation, application servers, web servers, storage servers, and/or database servers configured to run certain software applications and/or provide various security, web, storage, and/or database services. Although illustrated as a single entity in FIG. 2, security server 206 may include and/or represent a plurality of servers that work and/or operate in conjunction with one another.

Network 204 generally represents any medium or architecture capable of facilitating communication or data transfer. In one example, network 204 may facilitate communication between enterprise 202 and security server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
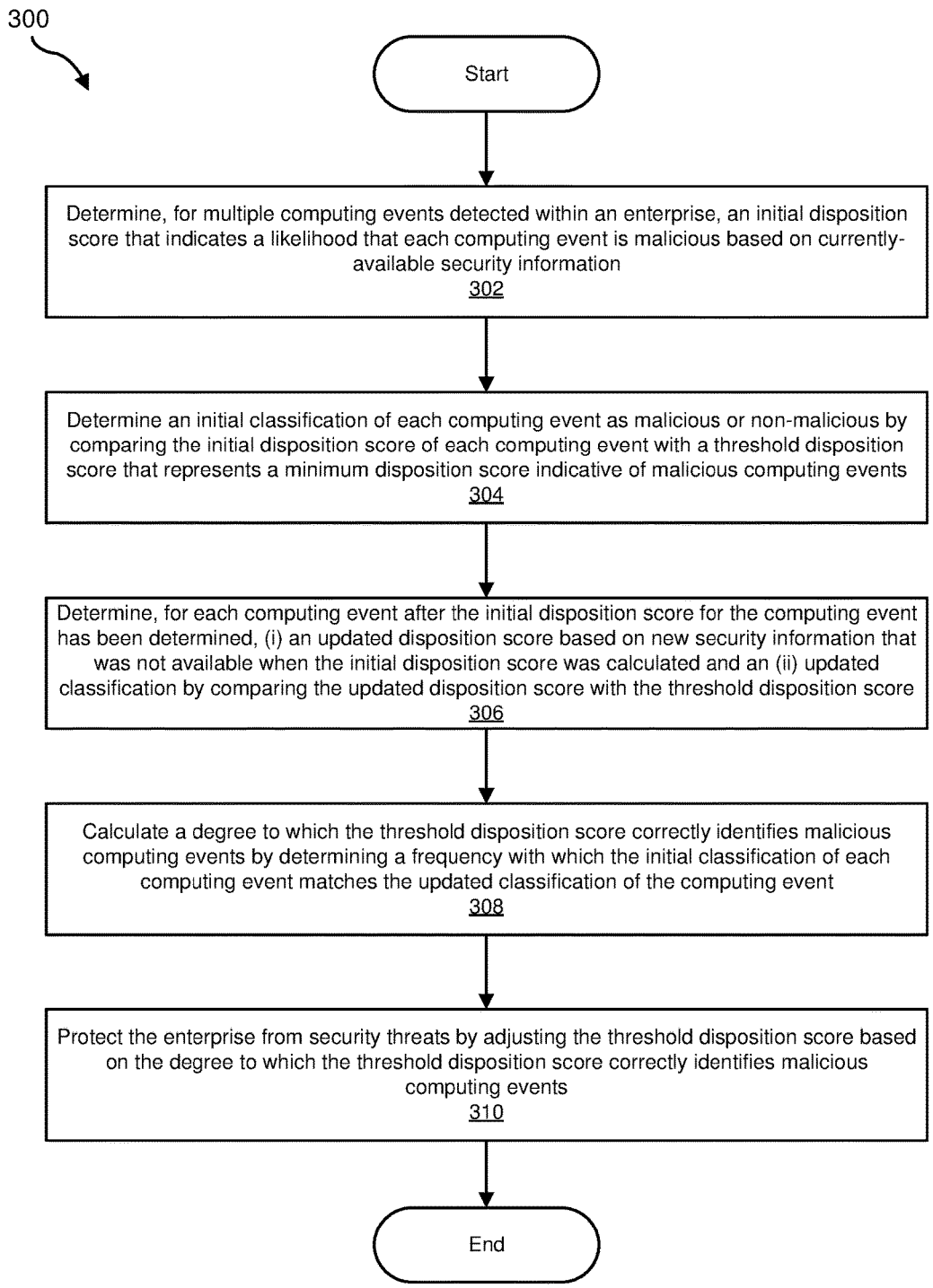
FIG. 3 is a flow diagram of an example method for detecting malicious computing events.

FIG. 3 is a flow diagram of an example computer-implemented method 300 for detecting malicious computing events. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may determine, for multiple computing events detected within an enterprise, an initial disposition score for each computing event that indicates a likelihood that the computing event is malicious based on currently-available security information. For example, scoring module 104 may, as part of security server 206 in FIG. 2, determine initial dispositions scores 122 for computing events 208 detected within enterprise 202.

The term "computing event," as used herein, generally refers to any type or form of incident, behavior, or action detected on or in connection with a computing device. In some examples, a computing event may represent any alteration in the configuration (e.g., software, settings, data, files, programs, etc.) of a computing device that may potentially compromise the security state of the computing device. For example, a computing event may represent an attempt by a user of an endpoint device to download, install, or execute a file or program on the endpoint device. In other examples, a computing event may represent an attempt by a user to distribute (e.g., via an electronic message or removable storage device) information from an endpoint device. Alternatively, a computing event may represent an attempt by an external entity to access information within an endpoint device (e.g., via intrusions, phishing attacks, and/or other security breaches).

The disclosed systems may detect computing events on endpoint devices in a variety of ways. In some examples, security module 110 may deploy software security agents on all or a portion of the endpoint devices within an enterprise. These agents may monitor the endpoint devices for any type or form of computing event that is potentially indicative of a security threat. For example, deployed agents may identify files that users of endpoint devices attempt to install or run. In addition, security agents may monitor content of emails and other electronic messages distributed to and from the endpoint devices. Additionally or alternatively, deployed agents may identify network resources (e.g., servers, websites, cloud-based applications, etc.) accessed by users via their endpoint devices.

Security agents deployed within an enterprise may identify a variety of information about detected computing events. In some examples, the agents may identify behaviors of a file involved in a computing event. For example, a security agent may record interactions between a detected file and other programs on an endpoint device. Similarly, a security agent may identify computing resources (e.g., registries, databases, or network resources) accessed or altered by a file. In addition, a security agent may identify and/or generate a hash of a file. In further examples, security agents may identify relevant contextual or configuration details about the endpoint device on which a computing event was detected, such as settings of the endpoint device and/or a user of the endpoint device. In addition, security agents may record a point in time (e.g., a date and/or time or day) at which a computing event occurred.

Furthermore, in some examples, a security agent may determine one or more security properties of a computing event. For example, a security agent may compare attributes of a computing event with malware definitions or signatures (e.g., hashes of files, objects, or behaviors known to be malicious). In one embodiment, a security agent may analyze a computing event using malware definitions or other security information provided by the security service that manages the security agent. The security agent may access the security information either locally (e.g., the information may be stored directly on the endpoint device on which the security agent is running) or remotely (e.g., the information may be stored in a cloud-based database or backend security server).

After a security agent identifies information about a computing event, the agent may send the information to a backend security server (such as security server 206 in FIG. 2). Security agents within an enterprise may distribute such information to scoring module 104 in real time (e.g., immediately after detection) or periodically (e.g., in batches). After receiving information about a detected computing event, scoring module 104 may determine an initial disposition score for the computing event.

The term "disposition score," as used herein, generally refers to any type or form of assessment or evaluation of the security characteristics of a computing event. In some examples, a disposition score may quantify a likelihood that a computing event is malicious (e.g., harmful to the security state or performance of an endpoint device). As a specific example, a disposition score for a computing event involving a suspicious file may indicate a probability that the file is an instance of malware (e.g., a virus, a worm, spyware, adware, etc.). In another example, a disposition score for a computing event involving an attempt to transfer data from an endpoint device may quantify a likelihood that the transferred data contains sensitive information and/or that the recipient of the data is unauthorized to access the sensitive information.

The term "initial disposition score," as used herein, generally refers to the first disposition score determined for a computing event. In some examples, an initial disposition score may be calculated immediately after a computing event is detected and/or after information about a detected computing event is sent to a backend security server. As will be explained in greater detail below, the term "updated disposition score" generally refers to any disposition score for a computing event that is determined after an initial disposition score has been determined.

Scoring module 104 may determine an initial disposition score for a computing event based on any type of security analysis or test performed on the computing event. In some embodiments, scoring module 104 may determine an initial disposition score for a computing event based on security properties of the computing event identified by a security agent that detected the computing event. For example, scoring module 104 may directly receive an initial disposition score from a security agent that was calculated by the security agent based on security information currently available to the security agent. Additionally or alternatively, scoring module 104 may determine an initial disposition score for a computing event by performing a security analysis on the computing event at a backend security server based on currently-available security information stored within the security server.

The term "security information," as used herein, generally refers to any type or form of data that represents or indicates properties of computing events that are known to be malicious or non-malicious. Examples of security information include, without limitation, hashes of malicious files, representations of malicious computing behaviors, whitelists of trusted files, blacklists of malicious files, and/or any additional data, test, or analysis that a security service may use to determine the reputation or trustworthiness of a computing event. In addition, the term "currently-available security information," as used herein, generally refers to any security information that is known to or accessible by a security service at a point in time at which the security service determines an initial disposition score for a computing event. As will be explained in greater detail below, the term "new security information" generally refers to any security information that became known to or accessible by a security service after an initial disposition score for a computing event has been determined.

In some examples, scoring module 104 may represent disposition scores as numbers within a predetermined range or scale. For example, scoring module 104 may assign computing events disposition scores between 0 and 5, with a score of 0 indicating a computing event that is confirmed to be non-malicious and a score of 5 indicating a computing event that is confirmed to be highly malicious. In the event that a security analysis performed on a computing event is inconclusive (e.g., currently available security information indicates slightly malicious or non-malicious properties of the computing event or no security information is currently known about the computing event), scoring module 104 may assign the computing event a score in the middle of the disposition score range.

Returning to FIG. 3, at step 304 one or more of the systems described herein may determine an initial classification of each computing event as malicious or non-malicious by comparing the initial disposition score of each computing event with a threshold disposition score that represents a minimum disposition score indicative of malicious computing events. For example, classification module 106 may, as part of security server 206 in FIG. 2, determine initial classifications 124 for computing events 208 by comparing initial disposition scores 122 with threshold disposition score 214.

The term "classification," as used herein, generally refers to any qualitative categorization of a disposition score for a computing event. In one embodiment, classification module 106 may classify disposition scores using a binary scale. For example, classification module 106 may classify computing events as either "malicious" or "non-malicious." The term "initial classification," as used herein, generally refers to any classification of a computing event based on the computing event's initial threshold disposition score. As will be explained in greater detail below, the term "updated classification" generally refers to any subsequent classification of a computing event, such as a classification based on the computing event's updated disposition score.

The systems described herein may determine an initial classification of a computing event in a variety of ways. In some examples, classification module 106 may determine a classification of a computing event by comparing the computing event's initial disposition score with a threshold disposition score. The term "threshold disposition score," as used herein, generally refers to any disposition score that represents a minimum or cutoff disposition score indicative of malicious computing events. In some examples, a threshold disposition score may represent a standard or preset threshold disposition score (e.g., the disclosed systems may automatically define a threshold disposition score to be implemented within an enterprise). In other examples, a threshold disposition may be specified by or tailored to an enterprise.

After scoring module 104 determines an initial disposition score for a computing event, classification module 106 may compare the initial disposition score with a threshold disposition score. In the event that the initial disposition score is the same as the threshold disposition score or indicates a higher degree of maliciousness than the threshold disposition score, classification module 106 may classify the computing event as malicious. In the event that the initial disposition score indicates a lower degree of maliciousness than the threshold disposition score, classification module 106 may classify the computing event as non-malicious.

In some embodiments, security module 110 may perform one or more security actions in response to detecting a malicious computing event. For example, security module 110 may direct a client-side security agent (such as the security agent that detected the malicious computing event) to block and/or remove any files or actions associated with the computing event. In addition, the disclosed systems may log and store attributes of both malicious and non-malicious computing events.

Returning to FIG. 3, at step 306 one or more of the systems described herein may determine, for each computing event after the initial disposition score for the computing event has been determined (i) an updated disposition score based on new security information that was not available when the initial disposition score was determined and (b) an updated classification by comparing the updated disposition score with the threshold disposition score. For example, after initial disposition scores 122 have been determined, scoring module 104 may, as part of security server 206 in FIG. 2, determine updated disposition scores 126 based on new security information 212. In addition, classification module 106 may, as part of security server 206 in FIG. 2, determine updated classifications 128.

The systems described herein may determine an updated disposition score for a computing event in a variety of ways. In some examples, scoring module 104 may determine that new security information has become available after the initial disposition score for one or more computing events has been determined. For example, scoring module 104 may determine that a security service has identified or generated new malware signatures or definitions. Additionally or alternatively, scoring module 104 may determine that a security service has updated a blacklist of malicious files and/or a whitelist of legitimate files. In further examples, scoring module 104 may identify a new behavioral assessment or additional security test capable of identifying malicious files. In some embodiments, scoring module 104 may identify new security information relevant to a particular computing event that was generated by a security service based on analyzing instances of the computing event detected on multiple endpoint devices and/or within multiple enterprises.

After determining that new security information relevant to a computing event is available, scoring module 104 may compare previously-recorded information about the computing event with the new security information. For example, scoring module 104 may compare a hash of a file involved in the computing event with recently-generated hashes of malicious files. In another example, scoring module 104 may analyze events surrounding the detection of the computing event using the new security information. In general, scoring module 104 may determine an updated disposition score of a computing event by any method used to determine an initial disposition score (as explained above in connection with step 302) using new security information. Notably, scoring module 104 may determine an updated disposition score for a computing event based solely on previously-recorded information about the computing event. For example, scoring module 104 may determine an updated disposition score for a computing event by reanalyzing or replaying contextual information representative of a state of an endpoint device at the time at which the computing event was detected.

After scoring module 104 determines an updated disposition score for a computing event, classification module 106 may determine an updated classification for the computing event. Specifically, classification module 106 may determine an updated classification of a computing event by comparing the updated disposition score with a threshold disposition score (i.e., the threshold disposition score used to determine the initial classification of the computing event).

Returning to FIG. 3, at step 306 one or more the described systems may calculate a degree to which the threshold disposition score correctly identifies malicious computing events by determining a frequency with which the initial classification of each computing event matches the updated classification of the computing event. For example, calculation module 108 may, as part of security server 206 in FIG. 2, calculate a degree to which threshold disposition score 214 correctly identifies malicious computing events by determining frequency 216 with which initial classifications 124 match corresponding updated classifications 128.

The systems described herein may determine a frequency with which initial classifications match updated classifications in a variety of ways. In some examples, calculation module 108 may determine a false positive rate and/or a false negative rate with which a threshold disposition score correctly identifies malicious computing events. Calculation module 108 may determine a false positive rate produced by a threshold disposition score by calculating a percentage of computing events that have an initial classification of malicious and an updated classification of non-malicious based on the threshold disposition score. Similarly, calculation module 108 may determine a false negative rate produced by a threshold disposition score by calculating a percentage of computing events that have an initial classification of non-malicious and an updated classification of malicious. As will be explained in greater detail below, such rates may indicate or quantify a degree of effectiveness and/or strictness of a security service.

Figure 4:
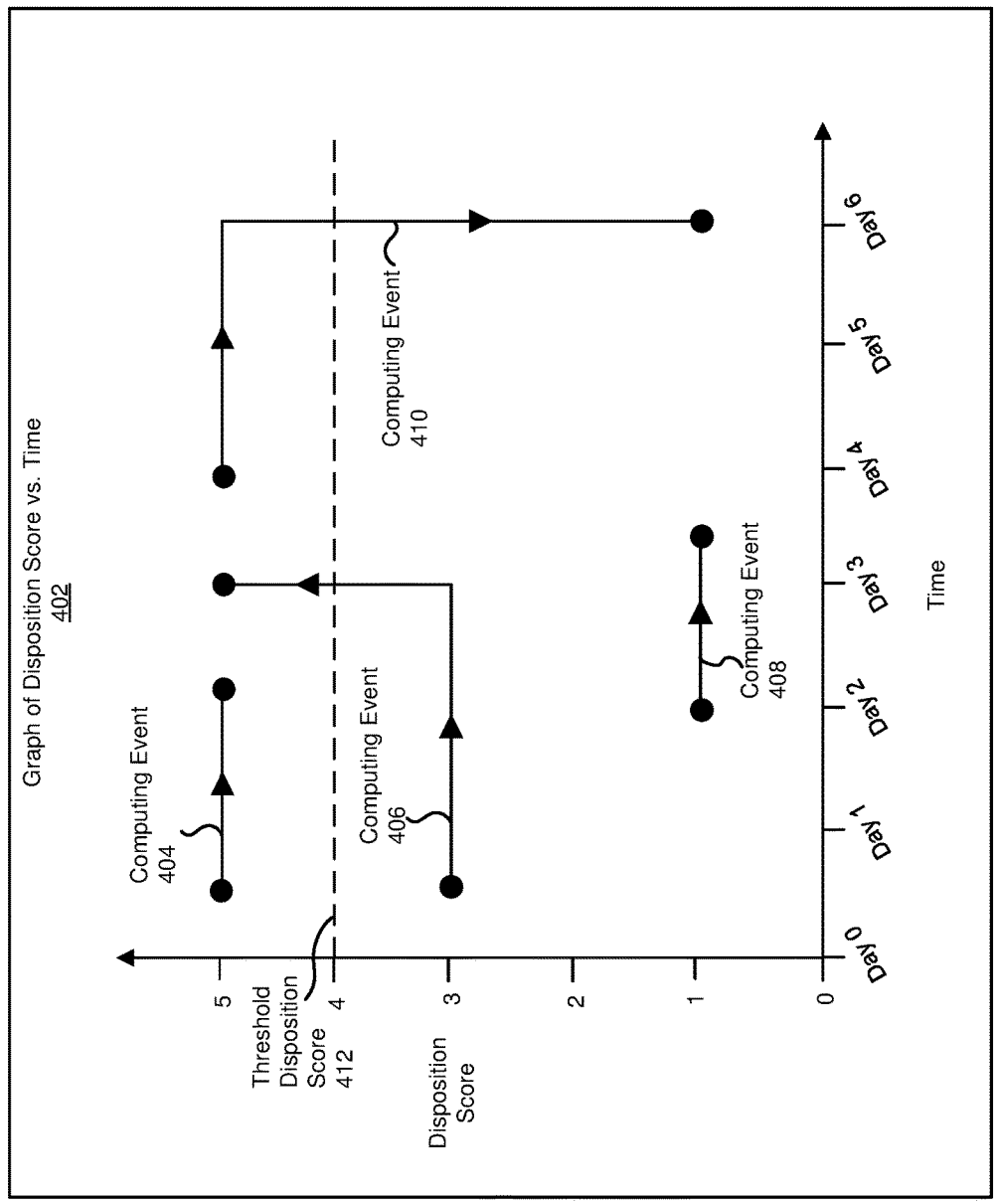
FIG. 4 is a graph of changes in example disposition scores over time.

As an example of identifying false positives and false negatives produced by a threshold disposition score, FIG. 4 illustrates a graph of disposition score vs. time 402. As shown in FIG. 4, graph 402 plots the initial and updated disposition scores of four example computing events (i.e., computing events 404, 406, 408, and 410) as the disposition scores changed over seven days (i.e., days 0-6). In this example, scoring module 104 may represent disposition scores as numbers within a scale of 0-5, with a disposition score of 5 indicating a highly malicious computing event and a disposition score of 0 indicating a legitimate computing event. Also in this example, classification module 106 may determine classifications of computing events based on a threshold disposition score 412 (i.e., a disposition score of 4).

In the example of FIG. 4, scoring module 104 may determine, on Day 0, that computing event 404 has an initial disposition score of 5. Based on threshold disposition score 412, classification module 106 may determine that the initial classification of computing event 404 is malicious. On Day 2, scoring module 104 may re-evaluate computing event 404 based on new security information. In the example of FIG. 4, scoring module 104 may determine that the new security information does not reveal new security characteristics of computing event 404. As such, the disclosed systems may determine that the updated disposition score and updated classification of computing event 404 are the same as the initial disposition score and initial classification. In this example, calculation module 108 may determine that computing event 404 represents a true positive.

Also in the example of FIG. 4, scoring module 104 may determine, on Day 0, that computing event 406 has an initial classification of 3. Based on threshold disposition score 412, classification module 106 may determine that the initial classification of computing event 406 is non-malicious. However, on Day 3, scoring module 104 may determine that new security information indicates that the updated disposition score of computing event 406 is 5. As such, classification module 106 may determine that the updated classification of computing event 406 is malicious. In this example, calculation module 108 may determine that computing event 406 represents a false negative.

Continuing the example of FIG. 4, on Day 2 scoring module 104 may determine that computing event 408 has an initial disposition score of 1. Therefore, classification module 106 may determine that computing event 408 has an initial classification of non-malicious. On Day 3, scoring module 104 may identify new security information relevant to computing event 408. However, this new security information may not indicate new security properties of computing event 408 and therefore modules 102 may determine that the updated disposition score and updated classification of computing event 408 match the initial disposition score and initial classification. In this example, calculation module 108 may determine that computing event 408 represents a true negative.

Finally, in the example of FIG. 4, scoring module 104 may determine, on Day 4, that computing event 410 has an initial disposition score of 5. Classification module 106 may therefore determine that the initial classification of computing event 410 is malicious. However, on Day 6, scoring module 104 may determine that new security information indicates that the updated disposition score of computing event 410 is 1. Therefore, classification module 106 may determine that the updated classification of computing event 420 is non-malicious. In this example, calculation module 108 may determine that computing event 410 represents a false positive.

In some examples, calculation module 108 may determine whether the initial classification of each computing event detected within an enterprise is a false positive, true positive, false negative, or true negative. Calculation module 108 may record these assessments and then determine an overall percentage of computing events that fall into each category. In some examples, calculation module 108 may further evaluate the ability of a threshold disposition score to correctly identify malicious computing events by computing a ratio of false positives to false negatives. As will be explained in greater detail below, such a ratio may indicate or represent the strictness of a threshold disposition score and/or security service that implements the threshold disposition score.

Returning to FIG. 3, at step 310 one or more of the systems described herein may protect the enterprise from security threats by adjusting the threshold disposition score based on the degree to which the threshold disposition score correctly identifies malicious computing events. For example, security module 110 may, as part of security server 206 in FIG. 2, protect enterprise 202 from security threat by generating adjusted threshold disposition score 218.

The disclosed systems may adjust a threshold disposition score in a variety of ways. In some examples, security module 110 may adjust a threshold disposition score in accordance with the security needs of an enterprise. For example, security module 110 may receive, from an enterprise, a desired level of strictness or severity for security services implemented within the enterprise. In one embodiment, an enterprise may indicate, to security module 110, an acceptable rate of false positives and/or an acceptable rate of false negatives. In another embodiment, an enterprise may indicate a desired ratio of false positives to false negatives.

In general, a high rate of false positives (or a high ratio of false positives to false negatives) indicates a strict security service. For example, a security service that detects a greater number of false positives than false negatives will be more likely to detect true positives. However, large numbers of false positives may inconvenience users and/or hinder productivity within an enterprise. Accordingly, an enterprise that handles highly classified or sensitive information may request a higher ratio of false positives to false negatives than an enterprise that handles less confidential information.

After receiving an indication of the desired strictness of security services for an enterprise, security module 110 may analyze false positive and/or false negative rates of computing events detected within the enterprise to determine an optimal threshold disposition score for the enterprise. For example, security module 110 may perform a retrospective analysis on the disposition scores of an enterprise's computing events. This retrospective analysis may involve computing false positive and/or false negative rates using a variety of theoretical or test threshold disposition scores. Specifically, security module 110 may determine a theoretical initial classification and a theoretical updated classification for one or more computing events using various test threshold disposition scores and the actual initial and updated disposition scores for the computing events. Security module 110 may then calculate rates of false positives and false negatives produced by each test threshold disposition score. Finally, security module 110 may select the threshold disposition score that produces a desired or appropriate rate of false positives and/or false negatives.

Figure 5:
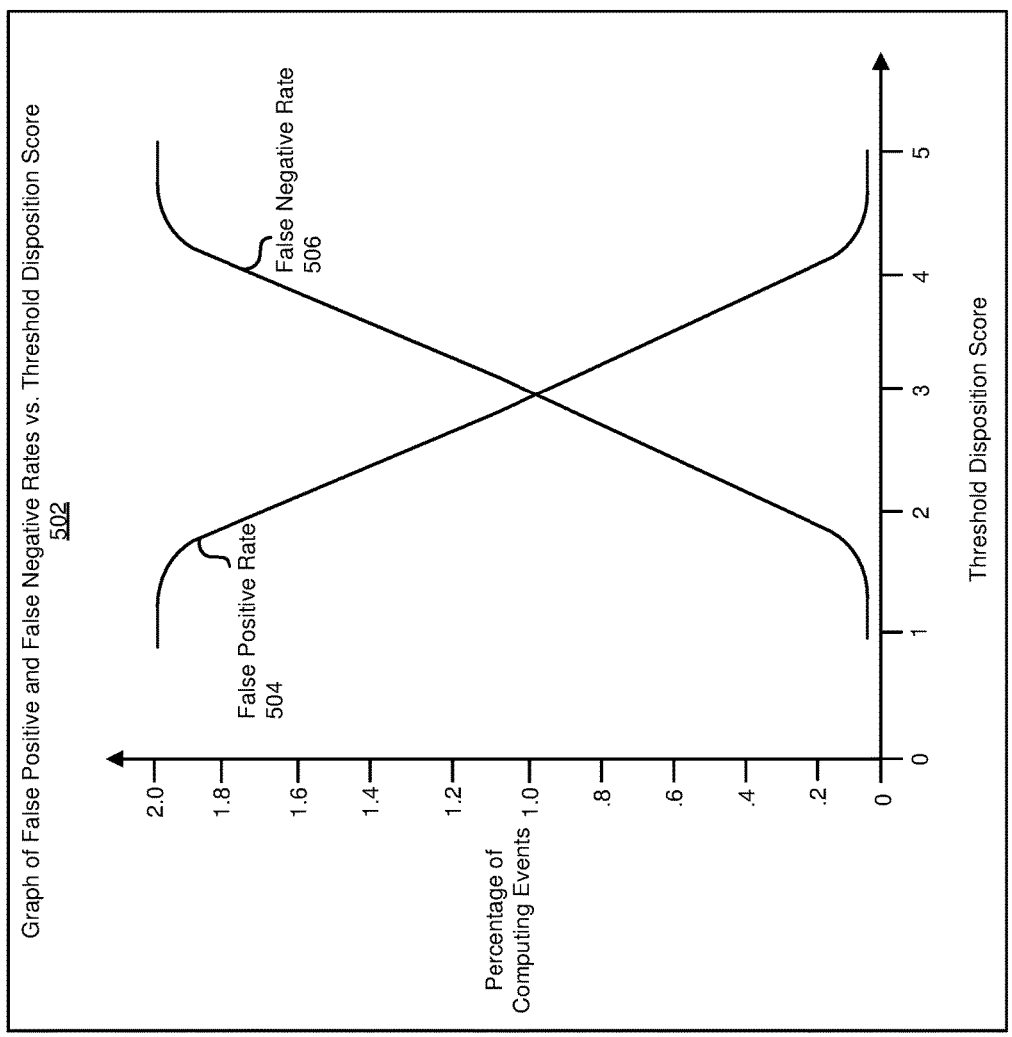
FIG. 5 is a graph of changes in example false positive and false negative rates with changes in threshold disposition scores.

As an example of determining false positive and false negative rates based on historical disposition scores, FIG. 5 illustrates a graph of false positive and false negative rates vs. threshold disposition score 502. As shown in FIG. 5, graph 502 plots values of a false positive rate 504 and a false negative rate 506 for various threshold disposition scores that may be implemented within an enterprise. In this example, at low threshold disposition scores, false positive rate 504 is high and false negative rate 506 is low (corresponding to a strict security system). As the threshold disposition score increases, false positive rate 504 decreases and false negative rate 506 increases (corresponding to a lenient security system). In one embodiment, security module 110 may use such information to select an optimal threshold disposition score for the enterprise. For example, if the enterprise requests a false positive to false negative ratio of 1, security module 110 may determine that the optimal threshold disposition score is 3. In the event that the enterprise requests a false positive to false negative ratio of 0.25, security module 110 may determine that the optimal threshold disposition score is 4.

In general, security module 110 may adjust the threshold disposition score for an enterprise based on any additional or alternative retrospective analysis of recorded security information describing computing events detected in the enterprise. In addition, security module 110 may adjust, create, or remove other security policies or rules within an enterprise based on such retrospective analyses. For example, security module 110 may reduce false positives within an enterprise by adding computing events that were determined to be false positives (or would be false positives when a low threshold disposition score is implemented) to a whitelist that identifies allowed or legitimate events. In this way, recurring instances of these computing events will be correctly identified as non-malicious. Furthermore, in some examples, security module 110 may lower the threshold disposition score for an enterprise after adding false positive computing events to a whitelist. As such, security module 110 may provide an enterprise with low rates of both false negatives and false positives, while still detecting the enterprise from harmful security threats.

As explained above in connection with FIGS. 3-5, a security service may determine an optimal threshold disposition score for an enterprise that accurately and efficiently classifies computing events as malicious or non-malicious according to the security needs of the enterprise. For example, the security service may collect and store information about potentially malicious computing events detected within the enterprise. The security service may analyze and score the computing events based on currently-available security information when the events are first detected. Specifically, the security service may calculate disposition scores for the events and compare the disposition scores to a threshold implemented within the enterprise. At later points in time, the security service may reanalyze the events (based on information stored about the events) when new security tests (e.g., malware signatures) become available. In this way, the security service may appropriately update the classification of computing events previously detected within the enterprise.

After determining initial and updated disposition scores for a set of computing events, the security service may evaluate the effectiveness of the current threshold disposition score for the enterprise by determining rates of false positives and false negatives (e.g., computing events that were initially classified incorrectly). In addition, the security service may adjust the threshold disposition score based on the enterprise's desired levels of false positives and/or false negatives. For example, by performing a retrospective analysis on the initial and updated dispositions scores of the computing events, the security service may identify a threshold disposition score that produces the enterprise's requested false positive and false negative rates.

Figure 6:
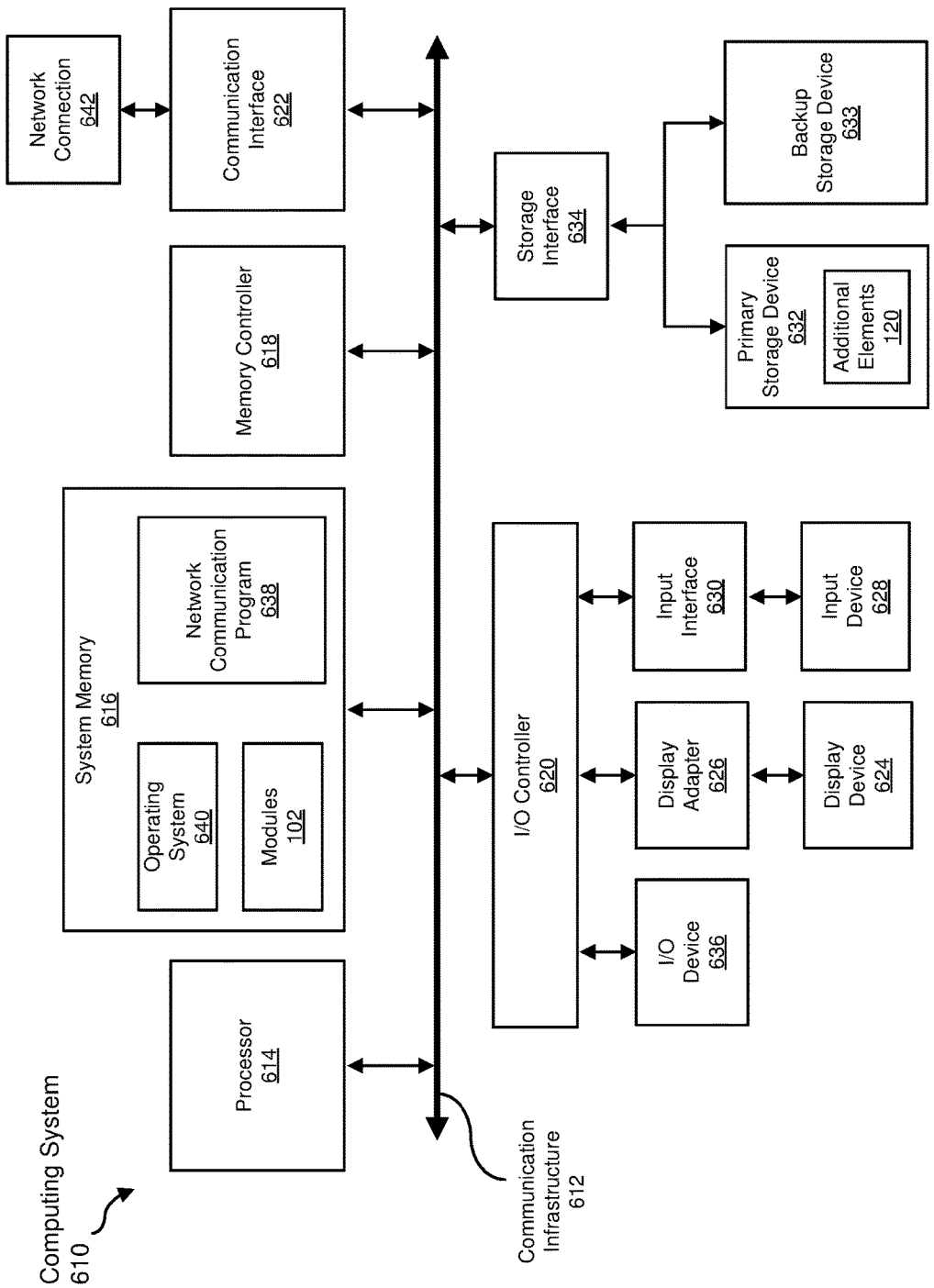
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633.

When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
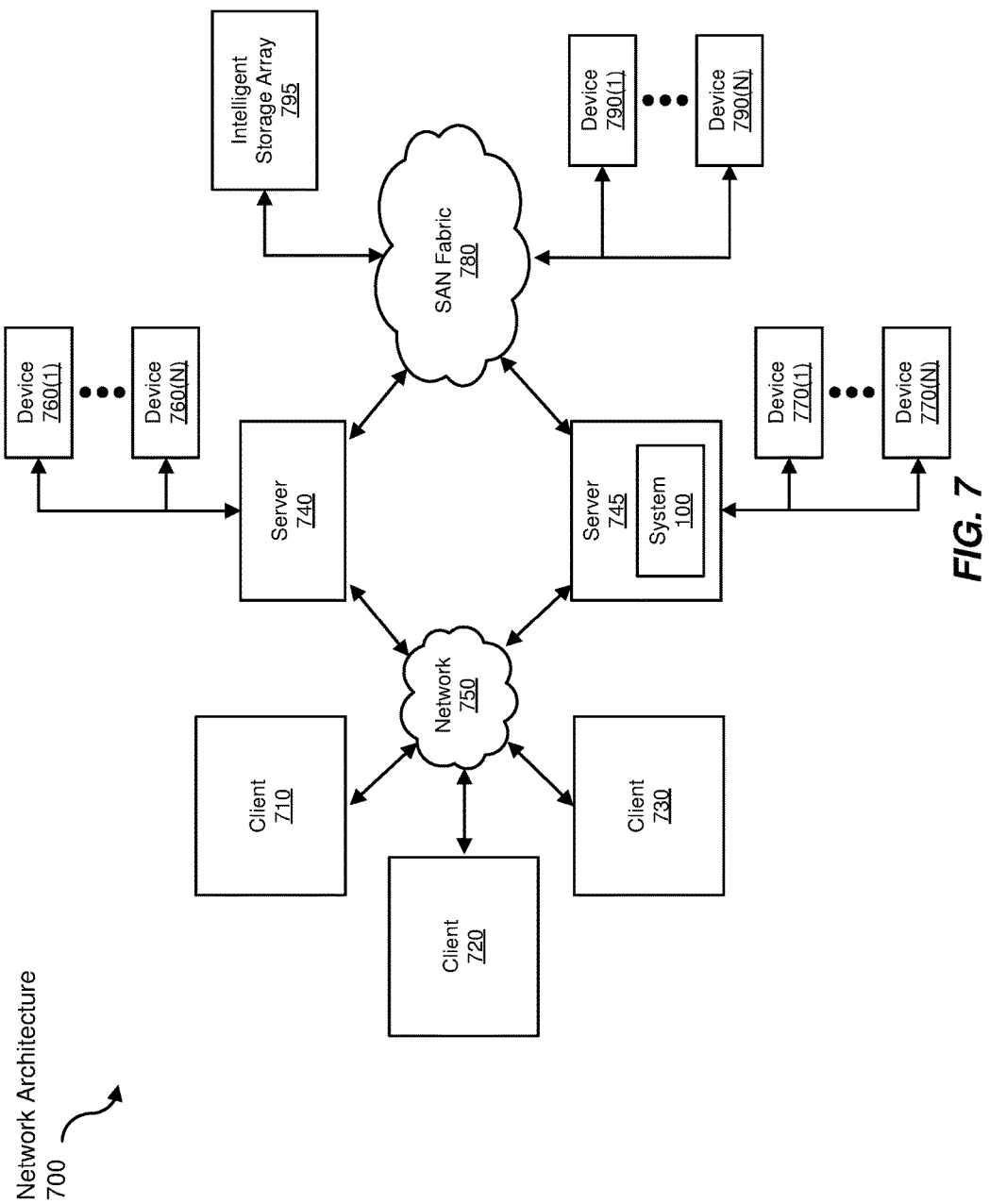
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting malicious computing events.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive computing events detected within an enterprise to be transformed, transform the computing events into a degree to which a threshold disposition score accurately identifies malicious computing events, output a result of the transformation to the enterprise, use the result of the transformation to appropriately adjust the threshold disposition score, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malicious computing events, at least a portion of the method being performed by a computing device comprising at least one processor, the method comprising:
   determining, for each of a plurality of computing events detected within an enterprise, an initial disposition score that indicates a likelihood that the computing event is malicious based on currently-available security information;
   determining an initial classification of each computing event as malicious or non-malicious by comparing the initial disposition score of each computing event with a threshold disposition score that represents a minimum disposition score indicative of malicious computing events;
   determining, for each computing event after the initial disposition score for the computing event has been determined:
      an updated disposition score based on new security information that was not available when the initial disposition score was determined; and
      an updated classification by comparing the updated disposition score with the threshold disposition score;
   calculating a degree to which the threshold disposition score correctly identifies malicious computing events by:
      determining a false positive rate produced by the threshold disposition score based on a percentage of computing events that have an initial classification of malicious and an updated classification of non-malicious; and
      determining a false negative rate produced by the threshold disposition score based on a percentage of computing events that have an initial classification of non-malicious and an updated classification of malicious; and
   protecting the enterprise from security threats by:
      receiving, from the enterprise, a desired ratio of false positives to false negatives detected within the enterprise;
      determining, based on a retrospective analysis of the initial disposition scores and the updated disposition scores of the plurality of computing events, an optimal threshold disposition score that produces the desired ratio of false positives to false negatives; and
      implementing the optimal threshold disposition score within the enterprise.

2. The method of claim 1, wherein the plurality of computing events comprises at least one of:
   an attempt to download a file onto an endpoint device within the enterprise;
   an attempt to distribute sensitive information from within the enterprise to an external entity; and
   an attempt by the external entity to access the sensitive information within the enterprise.

3. The method of claim 1, further comprising receiving, at a backend security server, the plurality of computing events from a security agent installed on at least one endpoint device within the enterprise.

4. The method of claim 3, wherein:
   receiving at least one computing event detected on the endpoint device further comprises receiving at least a portion of a configuration of the endpoint device at a point in time at which the computing event was detected; and
   determining the updated disposition score of the computing event comprises re-analyzing the configuration of the endpoint device using the new security information.

5. The method of claim 1, wherein the desired ratio of false positives to false negatives corresponds to a desired strictness of security services implemented within the enterprise.

6. The method of claim 1, further comprising:
   identifying computing events whose initial disposition scores were false positives; and
   adding the identified computing events to a whitelist within the enterprise such that similar computing events are classified as non-malicious.

7. The method of claim 6, further comprising decreasing the threshold disposition score after adding the identified computing events to the whitelist.

8. A system for detecting malicious computing events, the system comprising:
   a physical processor;
   a scoring module, executed by the physical processor, that determines, for each of a plurality of computing events detected within an enterprise:
      an initial disposition score that indicates a likelihood that the computing event is malicious based on currently-available security information; and
      an updated disposition score based on new security information that was not available when the initial disposition score was determined;
   a classification module, executed by the physical processor, that determines, for each computing event:
      an initial classification as malicious or non-malicious by comparing the initial disposition score of the computing event with a threshold disposition score that represents a minimum disposition score indicative of malicious computing events; and
      an updated classification by comparing the updated disposition score of the computing event with the threshold disposition score;
   a calculation module, executed by the physical processor, that calculates a degree to which the threshold disposition score correctly identifies malicious computing events by:
      determining a false positive rate produced by the threshold disposition score based on a percentage of computing events that have an initial classification of malicious and an updated classification of non-malicious; and
      determining a false negative rate produced by the threshold disposition score based on a percentage of computing events that have an initial classification of non-malicious and an updated classification of malicious; and
   a security module, executed by the physical processor, that protects the enterprise from security threats by:
      receiving, from the enterprise, a desired ratio of false positives to false negatives detected within the enterprise;
      determining, based on a retrospective analysis of the initial disposition scores and the updated disposition scores of the plurality of computing events, an optimal threshold disposition score that produces the desired ratio of false positives to false negatives; and
      implementing the optimal threshold disposition score within the enterprise.

9. The system of claim 8, wherein the plurality of computing events comprises at least one of:
- an attempt to download a file onto an endpoint device within the enterprise;
- an attempt to distribute sensitive information from within the enterprise to an external entity; and
- an attempt by the external entity to access the sensitive information within the enterprise.

10. The system of claim 8, wherein the scoring module, implemented within a backend security server, further receives the plurality of computing events from a security agent installed on at least one endpoint device within the enterprise.

11. The system of claim 10, wherein:
- the scoring module further receives at least a portion of a configuration of the endpoint device at a point in time at which at least one computing event was detected; and
- the scoring module determines the updated disposition score of the computing event by re-analyzing the configuration of the endpoint device using the new security information.

12. The system of claim 10, wherein the desired ratio of false positives to false negatives corresponds to a desired strictness of security services implemented within the enterprise.

13. The system of claim 10, wherein the security module further:
- identifies computing events whose initial disposition scores were false positives; and
- adds the identified computing events to a whitelist within the enterprise such that similar computing events are classified as non-malicious.

14. The system of claim 13, wherein the security module further decreases the threshold disposition score after adding the identified computing events to the whitelist.

15. A non-transitory computer-readable medium comprising one or more computer-readable instructions that, when executed by at least one processor of a computing device, cause the computing device to:
- determine, for each of a plurality of computing events detected within an enterprise, an initial disposition score that indicates a likelihood that the computing event is malicious based on currently-available security information;
- determine an initial classification of each computing event as malicious or non-malicious by comparing the initial disposition score of each computing event with a threshold disposition score that represents a minimum disposition score indicative of malicious computing events;
- determine, for each computing event after the initial disposition score for the computing event has been determined:
  - an updated disposition score based on new security information that was not available when the initial disposition score was determined; and
  - an updated classification by comparing the updated disposition score with the threshold disposition score;
- calculate a degree to which the threshold disposition score correctly identifies malicious computing events by:
  - determining a false positive rate produced by the threshold disposition score based on a percentage of computing events that have an initial classification of malicious and an updated classification of non-malicious; and
  - determining a false negative rate produced by the threshold disposition score based on a percentage of computing events that have an initial classification of non-malicious and an updated classification of malicious; and
- protect the enterprise from security threats by:
  - receiving, from the enterprise, a desired ratio of false positives to false negatives detected within the enterprise;
  - determining, based on a retrospective analysis of the initial disposition scores and the updated disposition scores of the plurality of computing events, an optimal threshold disposition score that produces the desired ratio of false positives to false negatives; and
  - implementing the optimal threshold disposition score within the enterprise.

16. The computer-readable medium of claim 15, wherein the plurality of computing events comprises at least one of:
- an attempt to download a file onto an endpoint device within the enterprise;
- an attempt to distribute sensitive information from within the enterprise to an external entity; and
- an attempt by the external entity to access the sensitive information within the enterprise.

17. The method of claim 1, wherein determining the optimal threshold disposition score comprises:
- for each of the plurality of computing events, computing a theoretical initial classification based on one or more test threshold disposition scores and a theoretical updated classification based on the one or more test threshold disposition scores;
- determining a rate of false positives produced by the one or more test threshold disposition scores and a rate of false negatives produced by the one or more test threshold disposition scores; and
- selecting the optimal threshold disposition score within the one or more test threshold disposition scores.

18. The method of claim 5, wherein a high desired ratio of false positives to false negatives corresponds to a strict security service that favors detecting malicious computing events over inconveniencing users due to false positives.

* * * * *